United States Patent
Smith et al.

[15] 3,697,625
[45] Oct. 10, 1972

[54] FLAME-RETARDANT POLYESTERS AND THERMOSETTING COMPOSITIONS BASED THEREON

[72] Inventors: Percy L. Smith, Dunbar; Lowell R. Comstock, South Charleston, both of W. Va.

[73] Assignee: Union Carbide Corporation, New York, N.Y.

[22] Filed: Nov. 23, 1970

[21] Appl. No.: 92,238

Related U.S. Application Data

[63] Continuation-in-part of Ser. No. 715,977, March 26, 1968, abandoned.

[52] U.S. Cl. ............ 260/869, 260/40 R, 260/75 H, 260/865
[51] Int. Cl. ..................... C08f 21/00, C08f 21/02
[58] Field of Search ............................ 260/75 H, 869

[56] References Cited

FOREIGN PATENTS OR APPLICATIONS 1,553,087   12/1968   France
732,265    4/1966    Canada

*Primary Examiner*—Melvin Goldstein
*Attorney*—Paul A. Rose, A. J. Cozzi and James C. Arvantes

[57] ABSTRACT

This invention relates to brominated polyesters, based on diols and as co-reactants a brominated maleic acid, a brominated tetrahydrophthalic acid, anhydrides or brominated monomeric esters of the anhydrides thereof, which are substantially free of dibromosuccinate and dibromohexahydrophthalate groups, contain bromine end groups and possess excellent flame-retardant properties, excellent thermal stability, excellent resistivity to ultraviolet light and can be used as flame-retardant plasticizers and when containing unsaturated groups, derived from non-halogenated unsaturated polycarboxylic acids, can be used in molding applications to form aesthetically attractive thermoset articles characterized by excellent chemical, physical and electrical properties.

19 Claims, No Drawings

FLAME-RETARDANT POLYESTERS AND THERMOSETTING COMPOSITIONS BASED THEREON

This application is a continuation-in-part application of our copending application, Ser. No. 715,977, filed Mar. 26, 1968, now abandoned.

This invention relates to flame-retardant polyesters, a process for the preparation thereof and to thermosetting compositions based thereon. More particularly, this invention relates to brominated polyesters based on diols and as co-reactants, a brominated maleic acid, a brominated tetrahydrophthalic acid, anhydrides or brominated monomeric esters of the anhydrides thereof, which are substantially free of dibromosuccinate groups and dibromohexahydrophthalate groups, contain bromine end groups and possess excellent flame-retardant properties, excellent thermal stability, excellent resistivity to ultraviolet light and can be used as flame-retardant plasticizers for urethane or vinyl resins and when containing unsaturated groups, derived from non-halogenated unsaturated polycarboxylic acids, can be used in molding applications to form aesthetically attractive thermoset articles, characterized by excellent physical, chemical and electrical properties which are useful as structural elements such as fenders, dashboards and other like component parts of automobiles.

The brominated polyesters of this invention have: an acid number of less than about 100, generally about 10 to about 60 and preferably about 25 to about 50; contain at least about 2 percent by weight combined bromine, generally about 2 to about 40 percent by weight combined bromine and preferably about 10 to about 25 percent by weight combined bromine based on the weight of the polyester; have - - - - bromine end groups; are the condensation reaction products of a diol and as co-reactants, a brominated maleic acid, a brominated tetrahydrophthalic acid, anhydrides or brominated monomeric esters of the anhydrides thereof; and are substantially free of dibromosuccinate groups and dibromohexahydrophthalate groups.

It is to be understood that mixtures of reactants noted in this application can be used if so desired.

Illustrative of suitable diols for purposes of this invention are those having the formula:

Formula I

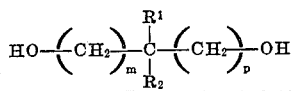

wherein the sum of $m + p$ is at least 1, generally 1 to 20 inclusive, preferably 4 to 10 inclusive and $R^1$ and $R^2$, which can be the same or different, are hydrogen or alkyl and when alkyl, containing one to 20 carbon atoms inclusive, preferably one to 10 carbon atoms inclusive. Specific compounds include, among others, ethylene glycol, propylene glycol, butanediol-1,2, butanediol-1,3, butanediol-1,4, hexanediol-1,6, decanediol-1,10, neopentyl glycol and the like.

Also suitable are the ether diols having the formula:

FORMULA II

wherein $a$ has a value of at least 1, preferably 2 to 6 inclusive, and $z$ has a value of at least 2, preferably 2 to 10 inclusive. Among compounds falling within the scope of this formula are diethylene glycol, dipropylene glycol, triethylene glycol, tetraethylene glycol, and the like.

Also suitable are the polyalkylene glycols such as polyethylene glycol and polypropylene glycol, having molecular weights ranging from about 1,100 to about 20,000.

In one aspect of this invention by which the brominated polyesters are prepared, a diol is condensed with any one or a mixture of compounds of Formulas III—VI below to a polyester as previously described.

Formula III.—Iso-dibromosuccinic acid (melting point 166–167° C. reported by Alex McKenzie-JCS. 101, 1196 [1925])

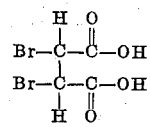

Formula IV.—Iso-dibromosuccinic acid anhydride

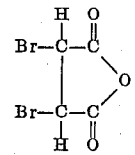

Formula V.—A dibromohexahydro-phthalic acid

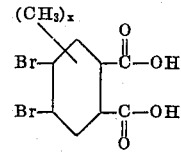

wherein $x = 0$ or $1$

Formula VI.—A dibromohexahydro-phthalic acid anhydride

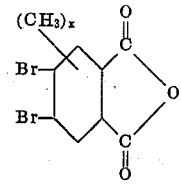

wherein $x = 0$ or $1$

The dibrominated compounds of Formulas III–VI are known compounds and can be conveniently prepared by reacting a mixture containing about equivalent amounts of bromine with the desired acid or anhydride corresponding to the compounds of Formulas III–VI, that is, maleic acid, tetrahydrophthalic acid or anhydrides thereof. This reaction is conducted at elevated temperatures, generally on the order of about 150° C.–160° C. with respect to the maleic acid anhydride and the tetrahydrophthalic acids and anhydrides thereof. Bromination of maleic acid is conducted at temperatures below 25° C. to insure prevention of isomerization to the fumarate groups. Tetrahydrophthalic acids or anhydrides thereof can also be brominated at room temperature, about 25° C., using a reaction solvent such as benzene.

The condensation reaction between the diols and the brominated compounds of Formulas III–VI to produce the polyesters of this invention is carried out at elevated temperatures on the order of about 165° C. to about 225° C. and preferably about 170° C. to about 200° C. for a period of time sufficient to produce a polyester having an acid number of less than about 100, being substantially free of dibromosuccinate groups and dibromohexahydrophthalate groups and having bromine end groups.

In conducting the reaction between the brominated compounds of Formulas III–VI and the desired diol, the diol is used in at least stoichiometric amounts, generally at least about one present in excess of the stoichiometric amount and preferably about one percent to about 10 percent in excess of the stoichiometric amount.

For purposes of stoichiometric calculations, amounts of diol are based on the total amount of "acidic reactants" in the reaction mixture. The "acidic reactants" include the brominated acids and anhydrides thereof as previously defined as well as monomeric esters of the brominated acid anhydrides as will be defined subsequently. "Acidic reactants" also include other acids and anhydrides thereof which can be used, if desired, in producing the polyesters of this invention. "Acidic reactants" also include hydrogen bromide which is split off during the condensation reaction. For purposes of stoichiometric calculations, one mole of hydrogen bromide is deemed to split off per mole of brominated compound of Formulas III–VI used.

Illustrative of suitable unsaturated polycarboxylic acids which can be used with the brominated materials to produce the polyesters of this invention are those having the formula:

FORMULA VII

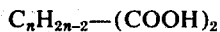

wherein $n$ is an integer having a value of 2 to 20 inclusive, preferably 2 to 10 inclusive. Among such acids can be noted fumaric acid, maleic acid, glutaconic acid, citraconic acid, itaconic acid, ethidenemalonic acid, mesaconic acid, allylmalonic acid, propylidenemalonic acid, hydromuconic acid, pyrocinchonic acid, allyl succinic acid, carbocaprolactonic acid, teraconic acid, xeronic acids, cetylmalonic acid and other like ethylenically unsaturated acids.

Other suitable unsaturated acids include 4-amyl-2,5-heptadienedioic acid, 3-hexynedioic acid, tetrahydrophthalic acid, 3-carboxy cinamic acid and the like.

If desired, the acid anhydrides of the acids previously described in the two preceding paragraphs can be used per se or in admixture with the acids.

Also, if desired, aromatic polycarboxylic acids, saturated polycarboxylic acids, anhydrides thereof or monocarboxylic acids can be used, in conjunction with the unsaturated polycarboxylic acids or the anhydrides thereof and the brominated materials, to produce the polyesters of this invention.

Illustrative of saturated polycarboxylic or aromatic polycarboxylic acids include, among others, phthalic acid, hexahydrophthalic acid, tetrachlorophthalic acid, succinic acid, adipic acid, suberic acid, azelaic acid, sebacic acid, and the like.

The presence of maleic acid, tetrahydrophthalic acid and anhydrides thereof in the reaction mixture can be effected by formulating a mixture containing the above-noted materials and brominating only a portion thereof.

For purposes of illustration, the reactions involving bromination and condensation to the polyesters of this invention can ideally be represented as shown below. The reactants, for purposes of simplicity and clarity, are shown as maleic acid anhydride and a glycol HO—A—OH, wherein A is the nucleus of the glycol.

Reaction No. 1.—Bromination

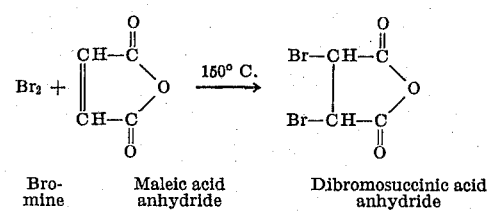

Bromine    Maleic acid anhydride    Dibromosuccinic acid anhydride

Reaction No. 2.—Condensation reaction.

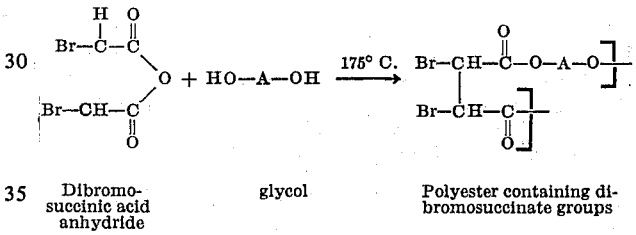

Dibromosuccinic acid anhydride    glycol    Polyester containing dibromosuccinate groups Reaction No. 3.—Dehydrobromination

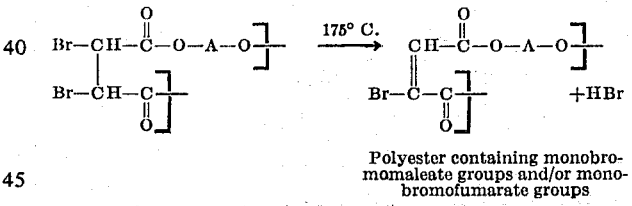

Polyester containing monobromomaleate groups and/or monobromofumarate groups

Reaction No. 4.—Reaction between polyester and HBr

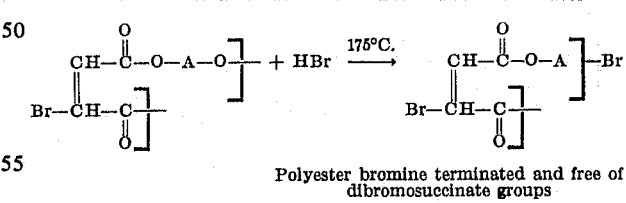

Polyester bromine terminated and free of dibromosuccinate groups

Reaction No. 5.—Reaction between free glycol and unreacted HBr

For purposes of illustration, the reactions involving a tetrahydrophthalic acid and a diol can be illustrated by Reactions 1A–5A.

Reaction No. 1A.—Bromination

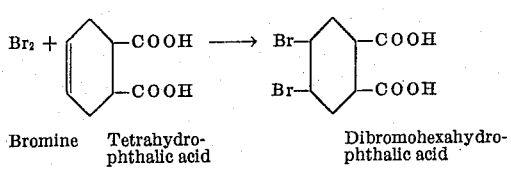

Bromine　Tetrahydro-　　　　Dibromohexahydro-
　　　　　phthalic acid　　　　　phthalic acid

Reaction No. 2A.—Condensation reaction

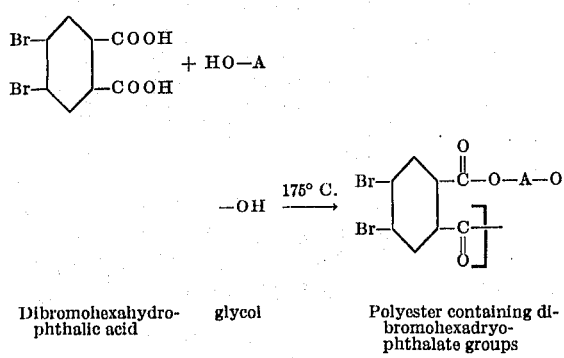

Dibromohexahydro-　glycol　Polyester containing di-
phthalic acid　　　　　　　bromohexadryo-
　　　　　　　　　　　　　phthalate groups Reaction No. 3S.—Dehydrobromination

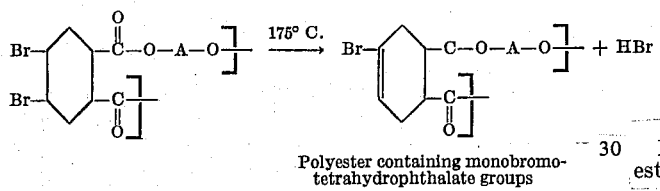

Polyester containing monobromo-
tetrahydrophthalate groups

Reaction No. 4A.—Reaction between polyester and HBr

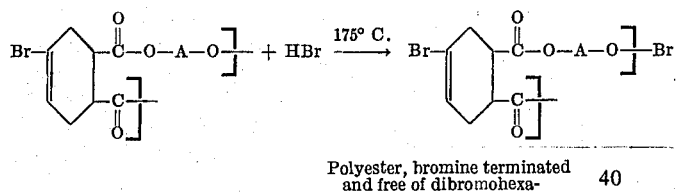

Polyester, bromine terminated
and free of dibromohexa-
hydrophthalate groups

Reaction No. 5A.—Same as Reaction No. 5.

The reactions involving other reactants of Formulas III–VI and diols can be represented ideally in a manner as shown by Reactions 1–5.

These reactions are believed to be the primary reactions, in idealized form, although not the entire reactions involving the brominated materials and the diols to produce the polyesters of this invention.

In another aspect of the present invention, rather than brominating the maleic acid anhydride or the tetrahydrophthalic acid anhydride, these compounds can first be reacted with the desired diol to form the monomeric ester, the monomeric ester brominated to the dibromo monomeric ester and thereafter condensed in the presence of an additional amount of a diol in amounts previously described to produce the polyesters of this invention. The preparation of polyesters by this method is illustrated by Example 3 of this application.

In carrying out this reaction, it is preferred that a diol be present in an amount of at least about one mole diol per mole of total anhydride content to produce the corresponding ester.

The temperature at which these anhydrides are reacted with the diols to form the corresponding monomeric esters is below about 150° C., generally about 50° C. to about 120° C., and preferably about 50° C. to about 75° C.

The resultant monomeric esters are then brominated in a manner previously described, with respect to the monomeric esters based on a tetrahydrophthalic acid anhydride. The bromination of monomeric esters based on maleic acid anhydride is conducted at temperatures below about 25° C. in order to insure prevention of isomerization to the fumarate groups.

The production of a monomeric ester and the bromination thereof can be illustrated by Reactions 6–7 below:

Reaction No. 6.—Production of the monomeric ester

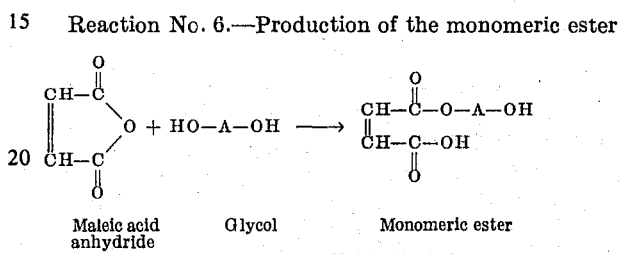

Maleic acid　　Glycol　　Monomeric ester
anhydride

Reaction No. 7.—Bromination of the monomeric ester

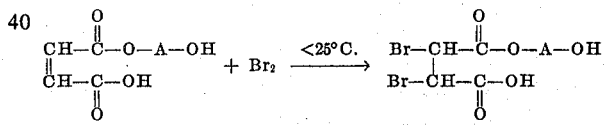

Analysis of the polyesters of this invention to determine the presence of dibromosuccinate and dibromohexahydrophthalate groups and to establish the presence of terminal bromine groups was carried out by Nuclear Magnetic Resonance.

The polyesters of this invention, as previously stated, can be used in urethane resins and in vinyl resins such as poly(vinyl chloride) as flame-retardant plasticizers. Also, they can be used to react with diisocyanates to produce polyurethane resins.

In addition, in those instances wherein the polyesters contain unsaturated groups such as maleate or fumarate groups derived from non-halogenated unsaturated polycarboxylic acids, they can be formulated into molding compositions and formed into thermoset products useful in the automotive industry, boat industry and the like.

In formulating such compositions which are to be used in molding applications, it is customary to admix, with the unsaturated polyesters, the following materials:

1. A polymerizable ethylenically unsaturated monomer which serves to cross-link the unsaturated polyester to a thermoset product.

2. A peroxide which serves to accelerate the cross-linking reaction.

3. Fillers, including fillers which serve as reinforcing agents.

Illustrative of suitable polymerizable, ethylenically unsaturated monomers are the vinyl monomers having the formula:

Formula VIII

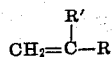

wherein R' is hydrogen, halogen or alkyl, i.e., methyl, R is a group having an unsaturated carbon-to-carbon, carbon-to-oxygen, or carbon-to-nitrogen group in conjugation with the vinyl group. Groups having such unsaturation in conjugation with the vinyl group are aryl, ketonic, heterocyclic, nitrile, carbalkoxy, carboxy and amido.

Specific vinyl monomers include the following:

Wherein R is aryl; styrene, halogenated styrenes such as chlorostyrene, Δ-chlorostyrene, p-iodostyrene, m-flurostyrene, dichlorostyrene and the like; alkyl substituted styrenes such as p-methylstyrene, Δ-methylstyrene, p-ethylstyrene, o-tert-butylstyrene and the like; alkoxy and aryloxy substituted styrenes such as p-ethoxystyrene, p-propoxystyrene, p-phenoxystyrene and the like;

Wherein R is ketonic; ethyl vinyl ketone, n-propyl vinyl ketone, phenyl vinyl ketone and the like;

Wherein R is heterocyclic; vinyl pyridine, vinyl quinoline, vinyl pyrrole, vinyl carbazole, vinyl thiophene and the like;

Wherein R is nitrile; acrylonitrile and the like;

Wherein R is amido; acrylamide, bicycloheptylacrylamide, diacetoneacrylamide and the like;

Wherein R is carboxy; acrylic acid and the like;

Wherein R is carbalkoxy; methyl acrylate, methyl methacrylate, butyl acrylate, octyl acrylate, lauryl acrylate, cyclohexyl acrylate, phenyl acrylate, benzyl acrylate and the like.

Also suitable is diallylphthalate and the like.

The amount of ethylenically unsaturated monomer used can vary over wide limits. For example, the monomer can be used in amounts of about 10 to about 60 percent by weight based on the combined weight of the monomer and the polyester. It is preferred to use about 20 to about 50 percent by weight ethylenically unsaturated monomer, based on the combined weight of the monomer and polyester.

Among suitable peroxides that can be used are those which function as free-radical polymerization initiators. Examples of such peroxides are the hydroperoxides such as tert-butyl hydroperoxide, cumene hydroperoxide, para-menthane hydroperoxide and the like; peroxy esters such as di-tert-butyl diperoxyphthalate, tert-butyl peroxyacetate and the like; alkyl peroxides such as di-tert-butyl peroxide, dibenzyl peroxide and the like; ketone peroxides such as methyl ethyl ketone peroxide, cyclohexanone peroxide and the like; acyl peroxides such as benzoyl peroxide, parachlorobenzoyl peroxide, 2,4-dichlorobenzoyl peroxide, lauroyl peroxide and the like.

The amount of peroxide used is sufficient to effect a cross-linking or thermosetting of the composition in a relatively short period of time. As a rule the amount used is about 0.1 to about 5 percent and preferably about 0.5 to about 2 percent by weight based on the weight of the polyester.

Fillers which are commonly employed in polyester compositions include, among others, glass fibers, clay, calcium carbonate, silica, hydrated alumina, antimony oxide, and the like. These materials are generally used in amounts of about 2 to about 80 percent by weight based on the weight of the polyester resin.

In addition, if desired, phosphorus containing compounds such as tri(2-chloroethyl)phosphate can be added to the compositions of this invention.

The compositions of this invention can be prepared by mixing the components in a suitable apparatus such as a Cowles dissolver, at temperatures on the order of about 25° C. to about 50° C.

Once formulated, the compositions can be formed into thermoset articles of desired shape, particularly thermoset articles such as automobile fenders, dashboards, building panels, boats and the like. The actual forming cycle used such as hand lay-up, spray-up and molding using matched metal molds, will vary and depend upon the composition being used and the ultimate article formed.

Suitable molding cycles are conducted at temperatures on the order of 25° F. to about 250° F. for periods of time ranging from about 0.5 minute to about 5 minutes.

The following examples further illustrate the present invention.

EXAMPLE 1

This example illustrates the preparation of a polyester based on a pre-brominated maleic acid anhydride.

(a) bromination of maleic acid anhydride

Into preparation reaction flask equipped with a mechanical stirrer, thermometer, condenser, dropping funnel, and gas-inlet tube, there was charged five (5) moles of maleic acid anhydride. The maleic acid anhydride was heated to a temperature of about 150° C. and 1.21 moles bromine were added dropwise into the flask while the contents of the flask were constantly stirred and maintained under a nitrogen gas atmosphere. After the addition of the bromine, the contents of the flask were heated for 1 hour at a temperature of about 150° C. At the end of the 1 hour period, the temperature of the reacted mixture dropped to about 50° C. and the bromine color (dark red) disappeared therefrom indicating completion of the bromination reaction.

(b) preperation of the brominated polyester

Into the flask containing the brominated maleic acid anhydride, (a) above, there was added one (1) mole of phthalic acid anhydride and 6.85 moles of ethylene glycol. The resultant mixture was heated to a temperature of 175° C. and maintained at this temperature for 5.5 hours. The resultant polyester had an acid number of 60 and was characterized by bromine end groups and by substantially complete absence of dibromosuccinate groups as determined by Nuclear Magnetic Resonance.

The polyester was cooled to a temperature of about 150° C. and hydroquinone, a stabilizer, was added thereto in an amount of 0.01 percent by weight, based on the weight of the polyester. Styrene was then admixed with the polyester to obtain a styrene solution containing 30 percent by weight styrene.

EXAMPLE 2

This example illustrates the preparation of a polyester based on a pre-brominated maleic acid anhydride, brominated in a reaction mixture containing in addition to the maleic acid anhydride, an aromatic acid anhydride and diol reactants.

Into a reaction flask equipped with a mechanical stirrer, thermometer, condenser, dropping funnel, and gas-inlet tube, there was charged five (5) moles of maleic acid anhydride, one (1) mole of phthalic acid anhydride and 6.85 moles of ethylene glycol. Bromine, in an amount of 1.21 moles, was added dropwise into the reaction flask while the contents of the reaction flask were constantly stirred and maintained under a nitrogen gas atmosphere. The rate at which the bromine was added was such that the contents of the reaction flask were maintained at a temperature of about 15° C. After the bromine addition and completion of the bromine reaction, evidenced by disappearance of the bromine color, the reaction mixture was heated to a temperature of 175° C. and maintained at this temperature for 5.5 hours. The resultant polyester had an acid number of 60 and was characterized by bromine end groups and by substantially complete absence of dibromosuccinate groups.

The polyester was cooled to a temperature of about 150° C. and hydroquinone added thereto in an amount of 0.01 percent by weight, based on the weight of the polyester. Styrene was then admixed with the polyester to obtain a styrene solution containing 30 percent by weight styrene.

In order to demonstrate the excellent properties of the polyesters of this invention, various properties were determined with respect to the polyesters of Example 1 and Example 2 and compared to the properties of a polyester, referred to as Control 1 prepared by a process in which the polyester was prepared first and then brominated. Control 1 was prepared as follows:

Into a reaction flask equipped with a mechanical stirrer, thermometer, condenser, dropping funnel and gas-inlet tube, there was charged five (5) moles of maleic acid anhydride, one (1) mole of phthalic acid anhydride and 6.3 moles of ethylene glycol. The mixture was heated for 5.5 hours at a temperature of 200° C. The resultant polyester had an acid number of 18.8. The resultant polyester was cooled to a temperature of about 150° C. and maintained at about 150° C. while bromine, in an amount of 1.21 moles, was added dropwise in the flask while the contents of the flask were constantly stirred and maintained under a nitrogen gas atmosphere. After the addition of the bromine, the contents of the flask were heated for 1 hour at a temperature of about 150° C. At the end of the one hour period, the temperature of the reaction mixture dropped to about 50° C. and the bromine color disappeared therefrom indicating completion of the bromination reaction. To the "post" brominated polyester, which had an acid number of 53 and was characterized by the substantial presence of dibromosuccinate groups as determined by Nuclear Magnetic Resonance, there was then added 0.01 percent by weight hydroquinone, based on the weight of the polyester. Styrene was then admixed with the polyester to obtain a styrene solution containing 30 percent by weight styrene.

The amount of reactants and time of reaction in each case, i.e., Example 1, Example 2 and Control 1, are as tabulated below.

| | Examples 1 and 2 | Control 1 |
|---|---|---|
| Reactants | Moles | Moles |
| Maleic acid anhydride | 5.0 | 5.0 |
| Phthalic acid anhydride | 1.0 | 1.0 |
| Ethylene glycol | 6.85 | 6.3 |
| Bromine | 1.21 | 1.21 |
| Time of reaction in hours | 5.5 | 5.5 |

Properties determined with respect to polyesters of Example 1, Example 2 and Control 1 are set forth in Table I.

TABLE I

| Properties of Polyester | Control 1 | Control 2* | Ex. 1 | Ex. 1* | Ex. 2 | Ex. 2* |
|---|---|---|---|---|---|---|
| Percent by weight combined bromine | 17.1 | 17.1 | 15.3 | 15.3 | 15.3 | 15.3 |
| Acid number | 18.8 | 18.8 | 60 | 60 | 60 | 60 |
| Acid number after post bromination of polyester | 53.0 | 53.0 | — | — | — | — |
| Properties of Styrene-Polyester Composition | | | | | | |
| Percent by weight combined bromine | 12 | 12 | 10.6 | 10.6 | 10.6 | 10.6 |
| Acid number | 35.8 | 35.8 | 35.0 | 35.0 | 38 | 38 |
| Viscosity, centipoises | 1528 | — | 1000 | 1000 | 900 | 900 |
| Gel time, min./sec. | 3/2 | — | 1/47 | — | 2/58 | — |
| Exotherm temp., °C. | 191 | — | 211 | — | 200 | — |
| Peak time, min./sec. | 5/5 | — | 2/50 | — | 4/47 | — |
| Color, Gardner Scale | 3 | 3 | 3 | 3 | 3 | 3 |
| Properties of Cured Styrene-Polyester Composition | | | | | | |
| Color, Gardner Scale | 7 | 7 | 4 | 4 | 4 | 4 |
| Heat distortion temp., °C. | 69 | 65 | 131 | 120 | 115 | 100 |
| Tensile strength, psi. | 8000 | 8000 | 7500 | 7500 | 8315 | 8000 |
| Elongation, percent | 1.5 | 1.5 | 1.5 | 1.5 | 1.5 | 1.5 |
| Flame-retardant properties, HLT-15 | Excellent ————————————→ | | | | | |
| Ultraviolet light stability, Δ R | 65 | 65 | 48 | 48 | 48 | 48 |
| Heat stability, weight loss after heating at 225°C. for 24 hours, percent | 20 | 21 | 13.5 | 14 | 13.5 | 14 |

The compositions of Table I contained the polyester, styrene and hydroquinone in the amounts previously noted. Also, compositions marked with an asterisk contained as an additional ingredient 3 percent by weight tri(2-chloroethyl)phosphate, based on the total weight of the composition.

Viscosity determinations noted in Table I and throughout this application were made at 25° C. using a Brookfield viscometer which was operated at 30 rpm with a No. 3 spindle.

Compositions noted as being cured in Table I and throughout this application were cured or thermoset by adding thereto 1.0 percent by weight benzoyl peroxide, based on the total weight of the composition and subjecting the resultant compositions to the following heating cycle:

2 hours at a temperature of 60° C.
3 hours at a temperature of 125° C.

Tensile strength determinations noted in Table I and throughout this application were carried out according to the procedure described in ASTM test 638–64T.

Elongation determinations noted in Table I and throughout this application were carried out according to the procedure described in ASTM test 638–64T.

Gel time determinations, including gel time, exotherm temperature and peak time, noted in Table I and throughout this application were carried out according to the standard tests of the Society Plastics Industry. HLT-15 Test described in Hooker Electrochemical Co. brochure MLT–152–3, 9/20/55.

Light stability reported as $\Delta R$ in Table I and throughout this application was determined according to the following procedure:

Panels, 1 inch by 2 inches by ⅛ of an inch, were molded from the compositions to be tested and cured in a manner previously described. These panels were then placed in a photovolt meter equipped with a monochromatic filter which allowed only light having a 440 millimicrons, blue light, to strike the panels. The amount of blue light passing through each panel was measured by a photovolt meter, Model No. 610, sold by the Photovolt Corp. and recorded as the initial blue light reflectance of each panel. Thereafter, each panel was placed in an air circulating oven, 3 inches from a 275 watt sunlamp which was also positioned in the air circulating oven. Each panel was allowed to remain in the oven, which was at a temperature of 80° C., for 96 hours with the sunlamp on. The "blue light reflectance" was again determined for each panel.

The change in reflectance, reported as $\Delta R$, and obtained by subtracting the initial blue light reflectance from the blue light reflectance after the heating step, is a measure of the degradation of each composition. The greater the $\Delta R$, the greater the degradation, that is, the poorer the ultraviolet light stability.

EXAMPLE 3

This example illustrates the preparation of a polyester based on a pre-brominated monomeric ester of tetrahydrophthalic acid and ethylene glycol.

Into a reaction flask equipped with a mechanical stirrer, thermometer, condenser, dropping funnel and gas-inlet tube, there was charged one (1) mole of tetrahydrophthalic acid anhydride and 4.5 moles of ethylene glycol. The mixture was heated at a temperature of 130° C., with agitation, for 15 minutes while under a nitrogen gas atmosphere. The mixture was cooled to room temperature and bromine, in an amount of 0.95 mole, was added dropwise to the contents of the flask. After completion of the bromination reaction, evidenced by disappearance of the bromine color, three (3) moles of maleic acid anhydride were added to the contents of the flask. The temperature of the reaction mixture was raised to 180° C. and maintained at 180° C. for 5.5 hours. The resultant polyester had an acid number of 50 and was characterized by bromine end groups and by the substantially complete absence of dibromohexahydrophthalate groups.

The polyester was cooled to a temperature of about 150° C. and hydroquinone was added thereto in an amount of 0.01 percent by weight, based on the weight of the polyester. Styrene was then admixed with the polyester to obtain a styrene solution containing 30 percent by weight styrene. To this solution there was then added tri(2-chloroethyl)phosphate in an amount of 3 percent by weight, based on the weight of the styrene solution.

The properties of the resultant composition were determined and compared to the properties of a composition which contained a post-brominated polyester — Control 2. This polyester was prepared as follows:

Into a reaction flask equipped with a mechanical stirrer, thermometer, condenser, dropping funnel and gas-inlet tube, there was charged one (1) mole of tetrahydrophthalic acid anhydride, three (3) moles of maleic acid anhydride and 4.25 moles of ethylene glycol. This mixture was heated under a nitrogen gas atmosphere at a temperature of 200° C. to an acid number of 40. The resultant polyester was cooled to a temperature of about 100° C. and bromine, in an amount of 0.95 mole, was added thereto dropwise, while the contents of the flask were constantly stirred and maintained under a nitrogen gas atmosphere to brominte the polyester in a manner previously described.

To the brominated polyester, there was then added 0.01 percent by weight hydroquinone and styrene to obtain a styrene solution containing 30 percent by weight styrene. Tri(2-chloroethyl)phosphate in an amount of 3 percent by weight was then added to the styrene-polyester solution.

Properties of each composition are noted in Table II.

TABLE II

| Properties of Styrene-Polyester Composition | Control 2 | Example 3 |
| --- | --- | --- |
| Percent by weight combined bromine | 13.3 | 12.2 |
| Acid number | 30 | 28 |
| Viscosity, centipoises | 1700 | 1500 |
| Color, Gardner Scale | 3 | 1 |
| Properties of Cured Styrene-Polyester Composition | | |
| Color, Gardner Scale | 7 | 2 |
| Heat distortion temp., °C. | 100 | 120 |
| Tensile strength, psi | 8325 | 8500 |
| Elongation, percent | 1.9 | 1.7 |
| Flame-retardant prop., HLT-15 | Excellent | Excellent |
| Ultraviolet light stability, $\Delta R$ | 68 | 47 |

Based on the weight of the polyesters, the percent by weight combined bromine of Control 2 was 19 and that of Example 3 was 17.4

A number of polyesters were prepared, compositions formulated therefrom and tested. The formulation of the compositions tested and the results of the test are set forth in Table III.

The polyesters noted in Table III were prepared as follows:

Example 4 — polyester was prepared according to the procedure described in Example 3, using the following reactants:

| Reactants | Moles |
|---|---|
| Methyl tetrahydrophthalic acid anhydride | 1.0 |
| Maleic acid anhydride | 3.5 |
| Ethylene glycol | 4.95 |
| Bromine | 0.95 |

Control 3 — polyester was prepared according to the procedure described for Control 2, using the following reactants:

| Reactants | Moles |
|---|---|
| Methyl tetrahydrophthalic acid anhydride | 1.0 |
| Maleic acid anhydride | 3.5 |
| Ethylene glycol | 4.95 |
| Bromine | 0.95 |

Example 5 — polyester was prepared according to the procedure described in Example 2, using the following reactants:

| Reactants | Moles |
|---|---|
| Maleic acid anhydride | 3.0 |
| Tetrahydrophthalic acid anhydride | 1.0 |
| Ethylene glycol | 4.5 |
| Bromine | 0.95 |

Control 4 — polyester was prepared in a manner described for Control 1, using the following reactants:

| Reactants | Moles |
|---|---|
| Maleic acid anhydride | 3.0 |
| Tetrahydrophthalic acid anhydride | 1.0 |
| Ethylene glycol | 4.4 |
| Bromine | 0.95 |

Control 5 — polyester was prepared in a manner described for Example 2, with the exception that fumaric acid was used in lieu of the maleic acid anhydride.

| Reactants | Moles |
|---|---|
| Fumaric acid | 5.0 |
| Phthalic acid anhydride | 1.0 |
| Ethylene glycol | 6.3 |
| Bromine | 1.21 |

Polyesters of Examples 4–5 were characterized by bromine end groups and by the substantially complete absence of dibromosuccinate and/or dibromohexahydrophthalate groups, as determined by Nuclear Magnetic Resonance.

Polyesters of Controls 3–5 were characterized by the presence of substantial amounts of dibromosuccinate and/or dibromohexahydrophthalate groups, as determined by Nuclear Magnetic Resonance.

TABLE III

| Properties of Polyester | Control 3 | Control 4 | Control 5 | Ex. 4 | Ex. 5 |
|---|---|---|---|---|---|
| Percent by weight combined bromine | 19 | 19 | 17.1 | 17.1 | 17.1 |
| Properties & Formulation of Styrene-polyester Composition | | | | | |
| Percent by weight combined bromine | 13.3 | 13.3 | 12 | 12 | 12 |
| Styrene, percent by weight | 30 | 30 | 30 | 30 | 30 |
| Hydroquinone, percent by weight | 0.005 | 0.005 | 0.005 | 0.005 | 0.02 |
| Tri(2-chloroethyl) phosphate, percent by weight | 3 | — | — | 3 | 3 |
| Acid number | 29 | 30 | 30 | 29 | 20 |
| Gel time, min./sec. | — | 2/43 | 3/10 | — | 3/40 |
| Exotherm temp., °C. | — | 188 | 195 | — | 231 |
| Peak time, min./sec. | — | 4/26 | 5/54 | — | 4/54 |
| Color, Gardner Scale | 4 | 3 | 3 | 3 | 1 |
| Properties of Cured Styrene-Polyester Composition | | | | | |
| Color, Gardner Scale | 8 | 7 | 7 | 4 | 2 |
| Heat distortion temp., °C. | 65 | 106 | 65 | 126 | 124 |
| Tensile strength, psi | 6100 | — | 7550 | 6350 | 8000 |
| Elongation, percent | 1.8 | 1.9 | 1.5 | 1.1 | 1.5 |
| Flame-retardant properties, HLT-15 | Excellent →  | | | | |
| Flammability ASTMD-635-56T | Self-extinguishing → | | | | |

A number of polyesters were prepared based on brominated maleic acid anhydride using the reactants set forth in Table IV and conducting the reactions relative thereto in a manner described in Example 1.

Properties of the polyester, properties of the compositions based thereon and formulation of the compositions are also set forth in Table IV.

Also, these polyesters were characterized by bromine end groups and by the substantially complete absence of dibromosuccinate groups.

TABLE IV

| Polyester Reactants | Ex. 6 | Ex. 7 | Ex. 8 | Ex. 9 | Ex. 10 |
|---|---|---|---|---|---|
| Maleic acid anhydride, moles | 3.0 | 2.0 | 1.0 | 3.0 | 2.0 |
| Tetrahydrophthalic acid anhydride, moles | 1.0 | 1.0 | 1.0 | 1.0 | 1.0 |
| Phthalic acid anhydride, moles | — | — | — | 1.0 | 1.0 |
| Ethylene glycol, moles | 4.5 | 3.4 | 2.2 | 5.5 | 4.4 |
| Bromine, moles | 0.95 | 0.75 | 0.49 | 0.95 | 0.95 |
| Properties of Polyester | | | | | |
| Percent by weight combined bromine | 17.5 | 17.1 | 17.1 | 14.3 | 17.1 |
| Properties & Formulation of Styrene-Polyester Composition | | | | | |
| Percent by weight combined bromine | 12.3 | 12.0 | 12.0 | 10.0 | 12.0 |
| Styrene, percent by weight | 30 | 30 | 30 | 30 | 30 |
| Hydroquinone, percent by weight | 0.02 | 0.02 | 0.02 | 0.02 | 0.02 |
| Tri(2-chloroethyl) phosphate, percent by weight | 3.0 | 3.0 | 3.0 | 3.0 | 3.0 |
| Gel time, min./sec. | 3/30 | 3/49 | 3/51 | 3/53 | 3/53 |
| Exotherm temp., °C. | 225 | 224 | 208 | 214 | 197 |

| | | | | |
|---|---|---|---|---|
| Peak time, min./sec. | 5/0 | 4/48 | 4/45 | 4/51 | 5/38 |
| Color, Gardner Scale | 1 | 2 | 1 | 2 | 1 |

Properties of Cured Styrene-Polyester Composition

| | | | | | |
|---|---|---|---|---|---|
| Color, Gardner Scale | 2 | 3 | 2 | 3 | 2 |
| Heat distortion temp., °C | 111 | — | — | — | — |
| Tensile strength, psi | 7500 | 8650 | 9770 | 7850 | 9800 |
| Elongation, percent | 1.4 | 1.7 | 2.2 | 1.6 | 2.4 |
| Flexural strength ASTMD-790-66 | 13,330 | 13,730 | 16,880 | — | 16,640 |
| Flexural modulus ASTMD-79066 | 5.45 | 5.54 | 5.29 | — | 5.56 |
| Flame-retardant properties, HLT-15 | Excellent ⟶ | | | | |
| Ultraviolet light stability, ΔR | 45 | 49 | 50 | 53 | 47 |

The unique properties of the polyesters of this invention are further evidenced by a comparison of the properties thereof with the properties of prior art polyesters. The polyesters, composition formulated therefrom and properties thereof are set forth in Table V.

EXAMPLE 11

Polyester was prepared in a manner described in Example 1 using the following reactants:

| Reactants | Moles |
|---|---|
| Maleic acid anhydride | 5.0 |
| Phthalic acid anhydride | 1.0 |
| Ethylene glycol | 6.85 |
| Bromine | 1.38 |

This polyester contained 17.1 percent by weight combined bromine.

Control 6 — polyester was prepared in a manner described in Example 1 using the following reactants:

| Reactants | Moles |
|---|---|
| Maleic acid anhydride | 5.0 |
| Phthalic acid anhydride | 1.0 |
| Ethylene glycol | 6.85 |
| Chlorine | 1.38 |

Control 7 — polyester was prepared according to Example 1 of the Ogura et al. patent, Pat. application Ser. No. 10,546 of 1960, using the following reactants:

| Reactants | Moles |
|---|---|
| Maleic acid anhydride | 1.0 |
| Dichlorosuccinic anhydride | 1.0 |
| Ethylene glycol | 2.2 |

Reaction Conditions:
1 hour at a temperature of 160°C.
1.5 hours at a temperature of 180°C.

TABLE V

| Properties & Formulation of Styrene-Polyester Composition | Control 6 | Control 7 | Ex. 11 |
|---|---|---|---|
| Styrene, per cent by weight | 25 | 25 | 25 |
| Hydroquinone, percent by weight | — | 0.01 | — |
| Tri(2-chloroethyl)phosphate, percent by weight | — | — | — |
| Acid number | 118 | 50 | 50 |
| Viscosity, centipoises | 150 | — | 2000 |
| Color, Gardner Scale | 8 | 4 | 3 |

Properties of Cured Styrene-Polyester Composition

| | | | |
|---|---|---|---|
| Color, Gardner Scale | 11 | 6 | 4 |
| Heat distortion temp., °C | 113 | 65 | 122 |
| Tensile strength, psi | 4500 | 6000 | 8000 |
| Elongation, per cent | 1 | 1.4 | 1.7 |
| Flexural strength, psi | 13,000 | 13,000 | 17,000 |
| Flame-retardant properties, HLT-15 | Poor | Poor | excellent |
| Ultraviolet light stability, ΔR | 62 | 68 | 47 |

The unique properties of the polyesters of this invention, that is, the fact that these polyesters are both flame-retardant and characterized by improved properties as described, was further evidenced on using monobromomaleic acid to produce a polyester according to the procedures described in Example 1. The polyester produced from monobromomaleic acid had exceedingly poor flame-retardant properties and could not be classified as a commercially acceptable flame-retardant polyester.

Polyesters prepared using the following polyols had properties comparable to the properties of the polyester of Example 1.

Diethylene glycol
Propanediol-1,2
Butanediol-1,4
Poly(ethylene glycol)

What is claimed is:

1. Process of preparing a brominated polyester which comprises condensing, at a temperature of about 165° C to about 225° C, a reaction mixture containing at least a stoichiometric amount of a diol selected from the group consisting of a diol having the formula:

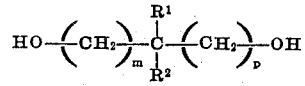

wherein the sum of $m + p$ is 1 to 20 inclusive and R and $R^1$ are hydrogen or alkyl containing one to 20 carbon atoms inclusive, a diol having the formula:

$$HO-(C_aH_{2a}O)_z-H$$

wherein $a$ has a value of 2 to 6 inclusive and $z$ has a value of 2 to 10 inclusive, a diol which is a polyalkylene glycol having a molecular weight of about 1,100 to about 20,000; and mixtures thereof; and an acidic reactant selected from the group consisting of iso-dibromosuccinic acid, a dibromohexahydrophthalic acid having the formula:

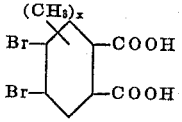

wherein $x$ is 0 or 1; anhydrides thereof, the dibrominated monomeric ester of maleic acid anhydride and a diol as defined; the dibrominated ester of a tetrahydrophthalic acid anhydride and a diol as defined; and mixtures thereof in amounts sufficient to yield a polyester containing at least about 2 percent by weight combined bromine, for a period of time sufficient to produce a polyester having an acid number of less than about 100, having bromine end groups and being substantially free of dibromosuccinate and dibromohexahydrophthalate groups.

2. Process as defined in claim 1 wherein the diol has the formula:

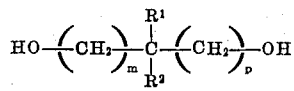

wherein the sum of $m + p$ is 4 to 10 inclusive and $R^1$ and $R^2$ are hydrogen or alkyl containing 1 to 10 carbon atoms inclusive.

3. Process as defined in claim 1 wherein ethylene glycol is present as a diol reactant in producing the polyester.

4. Process as defined in claim 1 wherein phthalic acid or anhydride thereof is present in the reaction mixture.

5. Process as defined in claim 1 wherein maleic acid or anhydride thereof is present in the reaction mixture.

6. A brominated polyester having an acid number less than about 100, having bromine end groups, containing at least about 2 percent by weight combined bromine, and being substantially free of dibromosuccinate and dibromohexahydrophthalate groups, said polyester being the condensation reaction product of a mixture as defined in claim 1.

7. A brominated polyester as defined in claim 6 containing about 2 to about 40 percent by weight combined bromine.

8. A brominated polyester as defined in claim 6 which is the condensation reaction product of a mixture containing at least a stoichiometric amount of a diol and isodibromosuccinic acid or anhydride thereof.

9. A brominated polyester as defined in claim 6 which is the condensation reaction product of a mixture containing at least a stoichiometric amount of a diol and a dibromohexahydrophthalic acid or anhydride thereof having the formula:

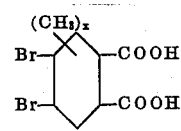

wherein $x = 0$ or 1.

10. A brominated polyester as defined in claim 6 wherein the mixture contains at least a stoichiometric amount of a diol and a dibrominated monomeric ester of maleic acid anhydride and a diol.

11. A brominated polyester as defined in claim 6 wherein the mixture contains at least a stoichiometric amount of a diol and a dibrominated monomeric ester of a tetrahydrophthalic acid anhydride and a diol.

12. A brominated polyester as defined in claim 6 wherein the diol is present in the reaction mixture in an amount of about 1 percent to about 10 percent in excess of the stoichiometric amount.

13. A brominated polyester as defined in claim 6 wherein the diol has the formula:

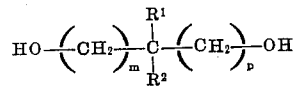

wherein the sum of $m + p$ is 4 to 10 inclusive and $R^1$ and $R^2$ are hydrogen or alkyl containing 1 to 10 carbon atoms inclusive.

14. A brominated polyester as defined in claim 6 wherein ethylene glycol is present as a diol.

15. A brominated polyester as defined in claim 6 wherein there is present in the reaction mixture phthalic acid or anhydride thereof.

16. A brominated polyester as defined in claim 6 wherein there is present in the reaction mixture maleic acid or anhydride thereof.

17. A thermosetting composition comprising the polyester as defined in claim 16 and an ethylenically unsaturated monomer in an amount of about 10 to about 60 percent by weight.

18. A thermosetting composition as defined in claim 17 wherein the ethylenically unsaturated monomer is styrene.

19. A thermosetting composition as defined in claim 17 containing a peroxide.

* * * * *